UNITED STATES PATENT OFFICE.

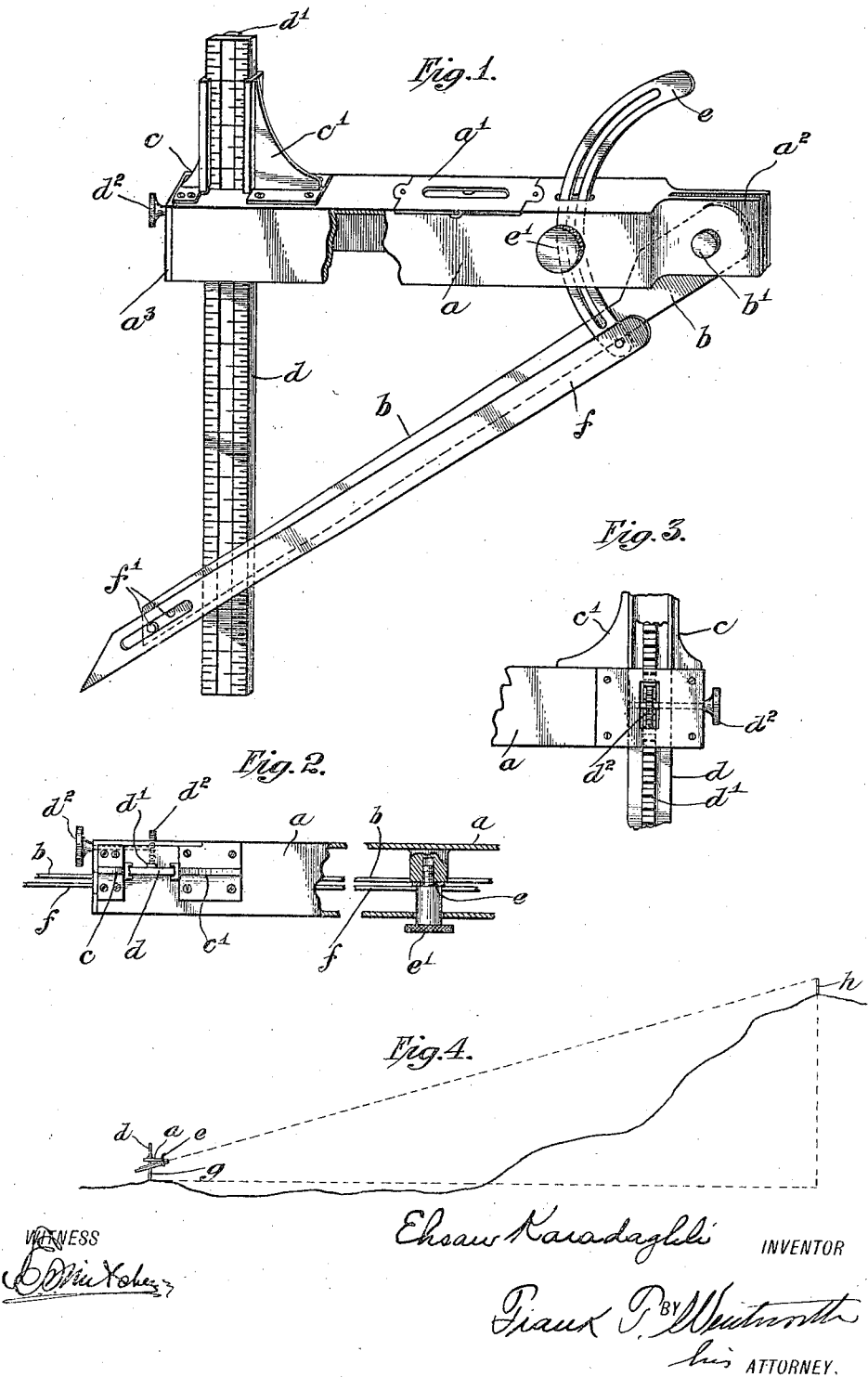

EHSAN KARADAGHLI, OF CHATHAM, NEW JERSEY.

GRADE-FINDER.

1,307,130. Specification of Letters Patent. Patented June 17, 1919.

Application filed February 19, 1919. Serial No. 278,038.

*To all whom it may concern:*

Be it known that I, EHSAN KARADAGHLI, a subject of the Shah of Persia, residing at Chatham, in the county of Morris and State of New Jersey, have invented certain new and useful Improvements in Grade-Finders, of which the following is a specification, reference being had therein to the accompanying drawings, which form a part thereof.

My invention relates to grade finders, and more particularly to an instrument for determining the difference in elevation of two points, the air-line distance between which is known, the elevation being determined by a simple multiplication of the rise per foot determined by the instrument of my invention, and the known lineal air-line distance in feet between the two points from which observations are made.

An instrument made in accordance with my invention is particularly adapted for use in what may be termed "short range work" as in digging wells, building construction, ditching, etc., the purpose of the invention being to provide an instrument by means of which approximately accurate rapid determination of desired angles, grades or depths, may be determined by simple arithmetic, thus adapting the instrument to the use of unskilled labor.

The instrument is so constructed that portions thereof may be stored within other portions when the device is not in use, thus avoiding bending or breakage of these parts of the instrument, facilitating the storage thereof in a tool-box, and permitting the instrument to be used as an ordinary square.

The instrument is so constructed that the parts thereof may be moved freely with relation to each other in properly positioning the parts when determining their angular relation, to define any grade or inclination, means being provided whereby the parts may be set in an adjusted position, so that if desired the computations may be subsequently made, or when the instrument is used in construction work, different parts of the structure may be accurately positioned in accordance with an initial determining measurement.

The invention consists in the novel features of construction and combination of parts hereinafter set forth and described, and more particularly pointed out in the claims hereto appended.

Referring to the drawings,

Figure 1 is a perspective view of an instrument embodying my invention, with a portion of the body for the spirit level, broken away to disclose the construction thereof;

Fig. 2 is a detailed view of the actuating means for the graduated rack member;

Fig. 3 is a plan view of the said mechanism shown in Fig. 2; and

Fig. 4 is a diagrammatic view illustrating the method of using the instrument.

Like letters refer to like parts throughout the several views.

In the embodiment of my invention shown in the drawings, I employ a metallic level body $a$ having in the upper face thereof an ordinary spirit level $a'$. One end of said body $a$ is reduced and forked as shown at $a^2$, there being pivoted therein an arm $b$, said arm being mounted upon a clamp screw $b'$ engaging both arms of the fork $a^2$, so that said arm $b$ may be clamped in any desired position.

Upon the top of the body $a$, adjacent the end thereof opposite the fork $a^2$, are oppositely disposed brackets $c-c'$ carrying guides extending at right angles to the top of said body, said guides having slidably mounted therein a slide member $d$ having on one side thereof graduations indicating a unit of measurement and fractions thereof, and and upon the other side thereof a rack $d'$ by means of which movement may be imparted to said slide member through the medium of a pinion $d^2$ mounted in an angular plate $a^3$ secured to the adjacent end of the body $a$.

The distance between the lower end of the fork $a^2$ and the inner face of the slide carried by the bracket $c$ is, in the form of the invention shown, six inches, and since this distance forms the basis of all calculations, it is essential that the unit of measurement indicated by graduations upon the slide member $d$ be one-half inch, the subdivisions thereof being one-half the corresponding divisions of an inch.

Slidably mounted in the body $a$ is a slotted segment $e$ having pivoted at the lower end thereof, a bar $f$ the lower edge of which is perfectly straight, said bar being connected by means of the pin and slot connection $f'$ with the arm $b$ and being of sufficient length to extend beyond the plane of the slide $d$.

The segment $e$ is so mounted in relation to the body $a$ that it may be locked in any adjusted position by means of the knurled screw $e'$ carried by said body.

The length of the bar $f$ is immaterial since all calculations are based upon the length of the body $a$, or rather the distance between the lower end of the fork $a^2$ and the inner face of the guide carried by the bracket $c$.

The body $a$ is made hollow, and the end flange of the plate $a^3$ slotted, as shown, so that when the device is not in use, the arm $b$ and the bar $f$ may be nested within said body, such nesting also permitting the instrument to be used as an ordinary square.

The operation of the herein described instrument is substantially as follows:—

When it is desired to use the instrument over a particular course, it is first necessary to determine the horizontal air-line distance between the two points of observation, stakes of the same length being driven in the ground at the highest elevation and the point from which the observation is being taken. These stakes are shown in the drawings at $g$ and $h$. A flat board or rod $h'$ is secured to the stake $h$ and adjusted to an angle so that by sighting the top surface of this board $h'$ at the top of the stake $g$, the air-line angle or grade between the two points $g$ and $h$ is fixed. The board $h'$ is then firmly secured in this position.

The set screws $b'$ and $e'$ are then loosened and the slide member raised in its guides carried by the brackets $c$ and $c'$, and the lower edge of the bar $f$ is laid upon the board $h'$.

The level body $a$ is then adjusted until it is brought to a horizontal position as indicated by the spirit level $a'$, the body $a$ turning freely about the pivot $b'$, and the set screw $e'$ moving in the slot in the segment $e$. When the parts are so adjusted, the lower edge of the fork $a^2$ will rest upon said board $h'$ and the arm $f$ will, throughout its entire length, bear upon said board.

Thereupon the set screws $b'$ and $e'$ are adjusted to lock the pivotal arm $b$ and the segment $e$ in this position. The pin and slot connection $f'$ is used for the purpose of compensating for the arc described by the opposite end of the bar $f$.

The parts having been so set, the slide member $d$, by means of the rack and pinion mechanism $d'$—$d^2$, is lowered until the lower edge thereof toward the guide upon the bracket $c$, is in the plane of the lower face of the bar $f$.

The rise per foot may then be determined by a reading of the graduation on the slide member $d$ at the bottom of the level body $a$. This body being six inches long and the unit of the graduations being one-half inch, the reading will be in inches or fractions of inches per foot of the actual horizontal lineal distance between the stakes $g$ and $h$.

By multiplying the indicated rise per foot by the known lineal distance between the stakes $g$ and $h$ horizontal to the earth's surface, the height of any given elevation may be quickly determined by simple methods. By using a supporting arm $b$ having a bar $f$ pivotally and slidably mounted thereon, one end of which bar is connected to a segment as described, the lower face of this bar may be accurately alined with the point of lower edge of the forked end $a^2$, this alinement being independent of any accuracy of the positioning of the pivotal support for said arm, thus permitting the maximum range of movement without deviation due to mechanical imperfections in the structure of the instrument.

The foregoing description is applicable to the use of the instrument when securing measurement of ground grades, but the instrument may be used with equal facility in construction work in the manner that I will now describe.

In roof construction, to secure a desired height of the ridge beam from the gable, and the desired pitch of the roof beams, the instrument may be set for the desired rise per foot in the roof beams, and as each roof beam is positioned the lower face of the bar $f$ may be placed upon the upper face of the beam and the beam adjusted until the spirit level $a'$ shows that the body $a$ is horizontal. The beam may then be secured in this position, repetition of this practice permitting all of the roof beams to be accurately positioned.

By folding the arm $b$ and bar $f$ within the body $a$, the right angular relation of this body and of the slide member $d$ will permit the instrument to be used as an ordinary square.

It is desired to call attention to the fact that the use of the instrument is based upon the known horizontal air-line distance between two points of observation and the known length of the body $a$, variations in the length of the portion of the bar $f$ between the slide member $d$ not entering into any of the calculations for determining elevation or pitch.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

1. A grade finder embodying therein a level body, a spirit level carried thereby, a slide member having graduations thereon adjustably mounted in and extending at right angles to the top surface of said level body, one edge of said slide member being a predetermined distance from one end of said body, a supporting arm pivotally connected adjacent said end of said body, a segment slidably mounted in said body adjacent the point of pivotal support of said arm, and a bar one end of which is pivotally connected with said segment, and the other end of which is connected by a slot and a pin connection with said arm, said bar being of a length to extend across the plane of movement of said slide member.

2. A grade finder embodying therein a level body, a spirit level carried thereby, a slide member having graduations thereon adjustably mounted in and extending at right angles to the top surface of said level body, one edge of said slide member being a predetermined distance from one end of said body, a supporting arm pivotally connected adjacent said end of said body, a segment slidably mounted in said body adjacent the point of pivotal support of said arm, a bar one end of which is pivotally connected with said segment, and the other end of which is connected by a slot and pin connection with said arm, said bar being of a length to extend across the plane of movement of said slide member, and means whereby said supporting arm and said segment may be locked in any adjusted position.

3. A grade finder embodying therein a level body, a spirit level carried thereby, oppositely disposed brackets carrying guides mounted adjacent one end of, and extending at right angles to the top surface of said level body, a slide member having graduations on the surface thereof and carrying a rack, a pinion mounted on said body in operative engagement with said rack, said slide member being a predetermined distance from the other end of said body, a supporting arm pivotally connected adjacent said last named end of said body, a segment slidably mounted in said body adjacent the point of pivotal support of said arm, and a bar one end of which is pivotally connected with said segment, and the other end of which is connected by a slot and pin connection with said arm, said bar being of a length to extend across the plane of movement of said slide member.

4. A grade finder embodying therein a hollow level body having a reduced, forked end, a spirit level carried thereby, a slide member having graduations thereon adjustably mounted in said body adjacent the end thereof opposite said forked end and extending at substantially right angles to the top of said level body, said slide member being a predetermined distance from the end of said forked end, a supporting arm one end of which is pivotally mounted between the forks of said forked end, a segment slidably mounted in said body adjacent the point of pivotal support of said arm, and a bar one end of which is pivotally connected with said segment, and the other end of which is connected by a slot and pin connection with said arm, said bar being of a length to extend across the plane of movement of said slide member, and said supporting arm and said bar being of a width to fold within the hollow of said body.

In witness whereof I have hereunto affixed my signature this 10th day of February 1919, in the presence of two subscribing witnesses.

EHSAN KARADAGHLI.

Witnesses:
SIDKY BEY,
F. T. WENTWORTH.